(12) United States Patent
Hanson et al.

(10) Patent No.: US 10,759,884 B2
(45) Date of Patent: Sep. 1, 2020

(54) FILM-FORMING COMPOSITIONS CONTAINING ZWITTERIONIC FUNCTIONAL POLYMERS AND THEIR USE IN METHODS OF REDUCING ADHESION OF AN ORGANIC SUBSTANCE TO A SUBSTRATE

(71) Applicant: ACULON, INC., San Diego, CA (US)

(72) Inventors: Eric L. Hanson, Carlsbad, CA (US); Eric L. Bruner, La Jolla, CA (US); Edward W. Hughes, Encinitas, CA (US)

(73) Assignee: ACULON INC., San Diego, CA (US)

( * ) Notice: Subject to any disclaimer, the term of this patent is extended or adjusted under 35 U.S.C. 154(b) by 0 days.

(21) Appl. No.: 15/912,800

(22) Filed: Mar. 6, 2018

(65) Prior Publication Data

US 2018/0251583 A1 Sep. 6, 2018

Related U.S. Application Data

(60) Provisional application No. 62/467,390, filed on Mar. 6, 2017.

(51) Int. Cl.

| | | |
|---|---|---|
| *C08F 20/38* | (2006.01) | |
| *C09K 8/588* | (2006.01) | |
| *C08J 7/04* | (2020.01) | |
| *E21B 43/25* | (2006.01) | |
| *B05D 1/02* | (2006.01) | |
| *B05D 5/08* | (2006.01) | |
| *B05D 1/18* | (2006.01) | |
| *B05D 1/28* | (2006.01) | |
| *C09K 8/60* | (2006.01) | |
| *C08F 230/08* | (2006.01) | |
| *C08F 220/38* | (2006.01) | |

(52) U.S. Cl.
CPC .............. *C08F 20/38* (2013.01); *B05D 1/02* (2013.01); *B05D 1/18* (2013.01); *B05D 1/28* (2013.01); *C08F 230/08* (2013.01); *C08J 7/0427* (2020.01); *C09K 8/588* (2013.01); *C09K 8/608* (2013.01); *E21B 43/25* (2013.01); *B05D 5/08* (2013.01); *C08F 220/382* (2020.02); *C08J 2327/06* (2013.01); *C08J 2333/14* (2013.01); *C08J 2367/00* (2013.01); *C08J 2369/00* (2013.01); *C08J 2375/04* (2013.01)

(58) Field of Classification Search
CPC . C08F 20/38; C09K 8/588; C08J 7/047; C08J 2367/00; C08J 2369/00; C08J 2375/04; C08J 2327/06; C08J 2333/14; E21B 43/25; B05D 1/02; B05D 1/18; B05D 1/28; B05D 5/08
See application file for complete search history.

(56) References Cited

U.S. PATENT DOCUMENTS

| | | | |
|---|---|---|---|
| 2004/0177957 | A1 | 9/2004 | Kalfayan et al. |
| 2009/0269003 | A1* | 10/2009 | Scully ............... G01N 21/7703 385/12 |
| 2014/0272428 | A1* | 9/2014 | Hanson .................. C09D 4/00 428/432 |
| 2015/0083416 | A1 | 3/2015 | Lant et al. |
| 2015/0083417 | A1 | 3/2015 | Lant et al. |

OTHER PUBLICATIONS

Suyeob Kim, Seungjoo Kwak, Seokchang Lee, Woo Kyung Cho, Jungkyu K. Lee and Sung Min Kang ,One-step functionalization of zwitterionic poly[(3-(methacryloylamino)propyl)dimethyl-(3-sulfopropyl)ammonium hydroxide] surfaces,Chem. Commun., 2015, 51, 5340-5342. (Year: 2015).*
Woo Kyung Cho, Bokyung Kong, and Insung S. Choi, Highly Efficient Non-Biofouling Coating of Zwitterionic Polymers: Poly((3-(methacryloylamino)propyl)-dimethyl(3-sulfopropyl)ammonium hydroxide) , Langmuir 2007, 23, 5678-5682 (Year: 2007).*

* cited by examiner

*Primary Examiner* — Bijan Ahvazi
(74) *Attorney, Agent, or Firm* — Blynn L. Shideler; Krisanne Shideler; BLK Law Group

(57) ABSTRACT

Film-forming compositions are provided comprising: (a) a zwitterionic-functional polymer; and (b) an organometallic compound. Also provided are methods of reducing adhesion of an organic substance to a substrate and methods of treating a siliceous or metal (M) oxide-containing subterranean formation penetrated by a well using the film-forming compositions described above.

18 Claims, No Drawings

US 10,759,884 B2

FILM-FORMING COMPOSITIONS CONTAINING ZWITTERIONIC FUNCTIONAL POLYMERS AND THEIR USE IN METHODS OF REDUCING ADHESION OF AN ORGANIC SUBSTANCE TO A SUBSTRATE

CROSS-REFERENCE TO RELATED APPLICATION

This application claims priority to provisional U.S. Patent Application Ser. No. 62/467,390, filed Mar. 6, 2017, and entitled "FILM-FORMING COMPOSITIONS CONTAINING ZWITTERIONIC FUNCTIONAL POLYMERS AND THEIR USE IN METHODS OF REDUCING ADHESION OF AN ORGANIC SUBSTANCE TO A SUBSTRATE", which is incorporated herein by reference in its entirety.

FIELD OF THE INVENTION

The present invention relates to film-forming compositions containing zwitterionic functional polymers. The present invention also relates to methods of reducing adhesion of an organic substance to a substrate and methods of treating a siliceous or metal (M) oxide-containing subterranean formation penetrated by a well, such as to increase oil production therefrom.

BACKGROUND OF THE INVENTION

Selective wetting of substrates by materials of different polarities and hydrophilicities can be controlled by the application of coatings to substrate surfaces. Selective wetting can be a useful property of substrate surfaces, such as in efforts to reduce the production of water and aqueous fluids from oil and gas wells. The challenge with most such coating chemistries is providing performance benefits while simultaneously having the ability to bind to surfaces; often coatings that bind to surfaces offer decreased selective wetting properties, and coatings that provide good selective wetting do not bind effectively to a substrate. For example, it is known that betaine-functional polymers have good selective wetting properties. However, they simply wash off surfaces because they are water-soluble. In contrast, incorporating betaine functionality into a traditional coating (for example, a urethane or acrylic) will achieve surface bonding but at the cost of the loss of the desirable repellant properties. In order to achieve chemical bonding of betaine-containing polymers to surfaces without sacrificing the desired properties, techniques such as graft polymerization are usually necessary, which are difficult to perform and are very substrate-specific.

It would be desirable to provide film-forming compositions useful in methods of reducing adhesion of an organic substance to a substrate, while overcoming the drawbacks of the prior art.

SUMMARY OF THE INVENTION

Film-forming compositions are provided comprising:
(a) a zwitterionic-functional polymer; and
(b) an organometallic compound. Also provided are methods of reducing adhesion of an organic substance to a substrate and methods of treating a siliceous or metal (M) oxide-containing subterranean formation penetrated by a well using the film-forming compositions described above.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various aspects and examples of the present invention as presented herein are each understood to be non-limiting with respect to the scope of the invention.

As used in the following description and claims, the following terms have the meanings indicated below:

The term "reactive" refers to a functional group capable of undergoing a chemical reaction with itself and/or other functional groups spontaneously or upon the application of heat or in the presence of a catalyst or by any other means known to those skilled in the art.

The terms "on", "appended to", "affixed to", "bonded to", "adhered to", or terms of like import means that the designated item, e.g., a coating, film or layer, is either directly connected to the object surface, or indirectly connected to the object surface, e.g., through one or more other coatings, films or layers.

The film-forming compositions of the present invention comprise a zwitterionic functional polymer (a) such as a betaine functional polymer. The polymer may be prepared from ethylenically unsaturated monomers by conventional addition polymerization or more often by a living polymerization process such as ATRP. Combinations of functional groups that render the polymer zwitterionic may include ammonium/sulfonate or phosphonium/carboxylate. Often the zwitterionic functional polymer contains functional groups that may provide polarity and/or chemical reactivity, such as silane groups. Such groups may be pendant and/or terminal to the polymer backbone. In a particular example of the present invention, silane groups may be incorporated into the polymer (a) by preparing the zwitterionic-functional polymer from a reaction mixture comprising:

(i) an ethylenically unsaturated zwitterionic monomer; and (ii) an organosilicon compound comprising functional groups that are reactive with the zwitterionic monomer (i).

As noted above, the organosilicon compound (ii) comprises functional groups that are reactive with the zwitterionic monomer (i). Suitable functional groups include alkoxy, hydroxyl, amino, amide, and halide groups. The organosilicon compound (ii) may serve as an initiator for ATRP. Suitable organosilicon compounds include alkoxysilane functional compounds such as (3-trimethoxysilyl)propyl-2-bromo-2-methylpropionate. Also suitable are organosilicon-containing compounds with ethylenically unsaturated groups, such as (3-trimethoxysilyl)propyl (meth)acrylate, and (3-trimethoxysilyl)propyl (meth)acrylamide.

Exemplary ethylenically unsaturated monomers that may be used as the zwitterionic monomer (i) include betaine-containing monomers such as carbobetaines and sulfobetaines. These monomers typically have the following structure:

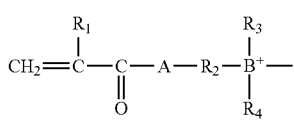

such as

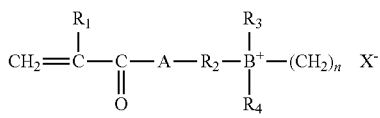

where $R_1$ is hydrogen or methyl; A is oxygen or —NH—; $R_2$ is ethylene or propylene; $R_3$ and $R_4$ are alkyl typically containing from 1 to 4 carbon atoms; B is N or P; n is an integer of 1 to 4; and $X^-$ is $SO_3^-$ or $CO_2^-$. Examples of such monomers are [2-(methacryloyloxy)ethyl]dimethyl-(3 sulfopropyl)ammonium hydroxide and [2-(methacryloyloxy)ethyl]dimethyl-(2 carboxyethyl)ammonium hydroxide.

The initiator may be applied to the intended substrate prior to initiation of the polymerization process. The substrate coated with initiator is then contacted with the remainder of the reaction mixture and polymerization is conducted under controlled radical polymerization conditions, such as by ATRP, to form a thin coating of a zwitterionic functional polymer on the surface of the substrate. Living polymerization such as controlled radical polymerization of the zwitterionic monomer results in covalent bonding of the zwitterionic functional polymer to the substrate surface, ensuring good adhesion and minimal thickness.

When ATRP is used as the polymerization method to form the zwitterionic functional polymer (a), the reaction mixture may further comprise an ATRP polymerization catalyst, typically a transition metal compound, which participates in a reversible redox cycle with the initiator; and a ligand, which coordinates with the transition metal compound. The ATRP process is described in further detail in International Patent Publication No. WO 98/40415 and U.S. Pat. Nos. 5,807,937, 5,763,548 and 5,789,487. The resulting polymer has a low polydispersity index because chain transfer reactions are minimized. Lower polydispersity indices enable the molecular weight of the polymer to be controlled and optimized for the particular application intended.

Catalysts that may be used in the ATRP process include any transition metal compound. It is preferred that the transition metal compound not form direct carbon-metal bonds with the polymer chain. Transition metal catalysts useful in the present invention may be represented by the following general formula:

wherein M is the transition metal, n is the formal charge on the transition metal having a value of from 0 to 7, and X is a counterion or covalently bonded component. Examples of the transition metal M include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$-$C_6$ alkoxy, cyano, cyanato, thiocyanato and azido. A preferred transition metal is Cu(I) and X is preferably halide, e.g., chloride. Accordingly, a preferred class of transition metal catalyst is the copper halides, e.g., Cu(I)Cl. It is also preferred that the transition metal catalyst contain a small amount, e.g., 1 mole percent, of a redox conjugate, for example, Cu(II)Cl$_2$, when Cu(I)Cl is used. Additional catalysts useful in preparing the pigment dispersant are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in ATRP for preparation of the polymerization catalyst include, but are not limited to, compounds having one or more nitrogen, oxygen, phosphorus and/or sulfur atoms, which can coordinate to the transition metal catalyst compound, e.g., through sigma and/or pi bonds. Classes of useful ligands include, but are not limited to, tertiary aliphatic amines, unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl(meth)acrylates. As used herein and in the claims, the term "(meth)acrylate" and similar terms refer to acrylates, methacrylates and mixtures of acrylates and methacrylates. A preferred class of ligands are the substituted bipyridines, e.g., 4,4'-dialkyl-bipyridyls. Additional ligands that may be used in preparing pigment dispersant are described in U.S. Pat. No. 5,807,937 at column 18, line 57 through column 21, line 43.

In certain examples of the present invention, the reaction mixture may additionally comprise one or more different ethylenically unsaturated monomers. Examples include olefins such as ethylene and propylene; (meth)acryloyl monomers such as (meth)acrylic acid and esters thereof such as methyl (meth)acrylate and ethyl (meth)acrylate; substituted esters thereof such as hydroxypropyl(meth)acrylate and hydroxyethyl(meth)acrylate; (meth) acrylamides; and vinyl aromatic compounds such as styrene and vinyl toluene.

Typically, the zwitterionic-functional monomer (i) is present in the reaction mixture in amounts of 10 to 100, usually 50 to 100 percent by weight; the percentages by weight being based on total monomer weight.

The film-forming compositions of the present invention further comprise an organometallic compound (b). The organometallic compound may comprise tantalum, titanium, zirconium, lanthanum, hafnium, and/or tungsten. Metal alkoxides are often used; an exemplary organometallic compound is tantalum (V) ethoxide. The organometallic compound (b) aids in binding the film-forming composition to a substrate, particularly siliceous or metal (M) oxide-containing substrates such as subterranean formations.

The zwitterionic-functional polymer (a) is typically present in the film-forming composition in an amount of at least 0.005 percent by weight, such as at least 0.01 percent by weight or at least 0.1 percent by weight, and at most 5 percent by weight, such as at most 4 percent by weight or at most 3 percent by weight, based on the total weight of the film-forming composition. The organometallic compound (b) is typically present in the film-forming composition in an amount of at least 0.005 percent by weight, such as at least 0.01 percent by weight or at least 0.1 percent by weight, and at most 2.5 percent by weight, such as at most 2 percent by weight or at most 1.5 percent by weight, based on the total weight of the film-forming composition. The balance of the film-forming composition (usually 92.5 to 99.985 percent by weight, based on the total weight of the film-forming composition) typically comprises a solvent component (c). Examples include haloalcohols such as trifluoroethanol or mixtures of haloalcohols with water and/or $C_1$-$C_4$ alcohols (methanol, ethanol, isopropanol, isobutanol, and the like).

The film-forming compositions of the present invention are useful in methods of reducing adhesion of an organic substance such as oil, grease, wax, proteinaceous material, or another hydrophobic substance to a substrate. When the film-forming compositions of the present invention are used to treat a subterranean formation, other additives known in the art for use in stimulation and well treatments may be included in the film-forming compositions. For example, surfactants, thickeners, diversion agents, pH buffers, etc. may be used.

Methods in accordance with the present invention comprise applying any of the film-forming compositions described above to the substrate. Such substrates include materials used in medical diagnostic equipment, implantable devices, and fluidic devices such as biological/DNA assays, sensors, electronic devices including wearable electronic fluidic devices such as sweat sensors, breathing apparati, filter media such as hydrophilic air filter media and stainless steel oil filter media, oil processing equipment, oil spill control equipment such as booms and skimmers, microfluidic channels, heat exchangers, and the like. Metals such as aluminum, copper, or stainless steel; metal oxides; plastic substrates; or non-plastic substrates such as glass are suitable. Glass substrates may comprise any type of glass such as at least one of fused quartz glass, soda lime silica glass, sodium borosilicate glass, lead oxide glass, and aluminosilicate glass.

Suitable examples of plastic substrates include organic polymers such as polyol(allyl carbonate) monomers, e.g., allyl diglycol carbonates such as diethylene glycol bis(allyl carbonate); polyurea-polyurethane (polyurea urethane) polymers, which are prepared, for example, by the reaction of a polyurethane prepolymer and a diamine curing agent; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated Bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from Bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co-and/or terpolymerized with polythiols, polyisocyanates, polyisothiocyanates and optionally ethylenically unsaturated monomers or halogenated aromatic-containing vinyl monomers. Also suitable are copolymers of such monomers and blends of the described polymers and copolymers with other polymers, e.g., to form interpenetrating network products.

The substrate may take any shape as desired for the intended application, such as flat, curved, convex, concave, tubular, or freeform. For example, the substrate may be in the form of a flat plate having two opposing surfaces, such as would be suitable for use in an assembly for DNA sequencing.

Prior to application of any coatings, the substrate may be cleaned such as by degreasing or argon plasma treatment, depending on the nature of the substrate. The film-forming composition can be applied to the surface of the substrate by dipping, rolling, spraying, printing, stamping, or wiping. The zwitterionic-functional polymer (a) is typically formed in situ upon application of the film-forming composition to the substrate. After application of the film-forming composition, any solvents are permitted to evaporate with or without wiping during evaporation, preferably at ambient temperature or optionally by the application of heat or forced-air drying. Usually ambient temperature ranges from 60 to 90° F. (15.6 to 32.2° C.), such as a typical room temperature, 72° F. (22.2° C.).

The resultant coating layer is very thin, having a thickness of about 100 nanometers or less, such as 0.5 to 100 nanometers.

The present invention further provides a method of treating a siliceous or metal (M) oxide-containing subterranean formation penetrated by a well and a method of increasing oil production from a siliceous or metal (M) oxide-containing subterranean formation penetrated by a well. Both methods comprise: (a) pumping into the well any of the film-forming compositions described above; and (b) chemically bonding one or more components of the film-forming composition to a surface of the subterranean formation.

The composition of the invention may be used to coat the surfaces of a subterranean formation and substantially reduce permeability to water within the formation without substantially reducing permeability to oil within the formation. It is believed that the film-forming composition preferentially adsorbs a layer of water and repels wetting by oil and other hydrocarbons, thus contributing to increased oil production. A subterranean formation may be treated using the film-forming composition by introducing the film-forming composition into the formation through a wellbore. The film-forming compositions may be introduced into a subterranean formation in any amount suitable for contacting a portion of a reservoir matrix of flow pathways. By "introduced" it is meant that a fluid may be pumped, injected, poured, released, displaced, spotted, circulated or otherwise placed within a well, wellbore, and/or formation using any suitable manner known in the art. The film-forming compositions may be introduced prior to, or may be mixed into, a conventional well treatment fluid.

The following examples are intended to illustrate various embodiments of the invention, and should not be construed as limiting the invention in any way.

EXAMPLES

Example 1

A film-forming composition comprising a zwitterionic-functional polymer and an organometallic compound in alcohol solvent (available from Aculon, Inc., as ACULON ON 470) in accordance with the present invention was dispensed onto a clean polyester fabric and wiped onto a sheet of thermally hardcoated polycarbonate (Makrolon, available from Covestro AG) and allowed to dry at room temperature for 10 minutes. Both this sample and an uncoated (control) sample were dipped into seawater for 15 seconds, then dipped into a beaker containing both seawater and crude oil. While under water, the coated sample was completely clear whereas the uncoated control was obscured entirely by a layer of oil. Upon removal and rinsing with fresh seawater, the control sample was still obscured whereas the treated sample was clear and no trace of oil was adhered to the surface. This result was also demonstrated on glass and hardcoated acrylic panels.

Example 2

ACULON ON 470 film-forming composition was applied to 3 samples each of polyurethane, polyvinyl chloride, Aluminum 6061, and Aluminum 5052 (available from McMaster Carr Supply Company). The aluminum (6061 and 5052) substrates were degreased with parachlorobenzotrifluoride prior to receiving a 10-minute dip cleaning with sonication using Aculon 905 metal cleaner, available from Aculon, Inc., at 60° C. The polyurethane samples were wiped clean with isopropyl alcohol prior to treatment. The polyvinyl chloride samples were cleaned with Corona discharge for ~10 seconds as well as being wiped with isopropyl alcohol prior to treatment.

All substrates were flow coated with the composition. Excess composition was allowed to drain and then the coated substrates were allowed dry prior to durability testing. The following procedures were used:

Durability Testing: Samples of each substrate material were halfway suspended in a layer (~12.5-15 mL) of crude oil sitting on top of roughly 500 mL of seawater in 1 L beakers for seven days. Three samples of each substrate material received the same coating for replicate data collection, and in addition each substrate material also had one sample not coated as a control. The orbital shakers rotated at 80 rpm. Durability of the coating was monitored via video documentation after 24, 72, and 168 hours of exposure to the oil and seawater. The videos documented 1) the lifting the samples out of and submerging the samples into the mixture, as well as 2) the ability to rinse off the oil from the substrate via a squirt bottle filled with seawater. The Pass/Fail criteria is a subjective measure of whether the coatings greatly enhance the oil repellency of the various substrate materials:

TABLE 1

| Substrate | Pass/Fail |
| --- | --- |
| Al 6061 | Pass |
| Al 5052 | Pass |
| Polyurethane | Pass |
| PVC | Pass |

Leach Testing: Samples of each coated substrate (3 replicates of the coating and 1 uncoated control) were allowed to sit in closed bottles submerged in seawater for seven days. Chemical leaching was monitored via UV absorption after 168 hours (7 days). The spectrophotometer scanned between 200 and 800 nm. This testing was performed to evaluate whether any UV-Vis absorbing components of the coating would dissolve into seawater in seven days immersion at ~72° F. None of the sampes showed any detectable leaching; there were small changes in absorbance around 210 nm in every sample, likely due to slight changes in the composition of the baseline seawater solution used to "blank" the spectrometer before analyzing samples.

The pass/fail criteria for leaching is that there is no significant difference in leaching of coated substrates from the uncoated substrates. All coated substrates outperformed the blank substrates (controls) in their ability to prevent the Gulf of Mexico Crude oil from adhering to the substrate materials.

TABLE 2

| Substrate | Pass/Fail |
| --- | --- |
| Al 6061 | Pass |
| Al 5052 | Pass |
| Polyurethane | Pass |
| PVC | Pass |

Example 3

A series of coreflooding experiments was conducted to determine the effectiveness of film-forming compositions of the present invention in increasing the oil regained permeability in Grey Berea sandstone.

Procedure Steps:
1. Dry core at 250° F.
2. Measure core weight, length and diameter.
3. Saturate the core with ISOPAR L (available from ExxonMobil Chemical) in vacuum pump for four hours.
4. Measure the core weight, calculate the core pore volume and porosity.
5. Coreflood with ISOPAR L in rates of 0.5, 2, 5 ml/min. Calculate the initial permeability of Grey Berea sandstone at room temperature 77° F.
6. Coreflood with brine (2% KCl) at rates of 0.5, 2, 4 ml/min. Calculate the effective permeability of brine in residual ISOPAR at 150° F.
7. Coreflood with ISOPAR L in rates of 0.5, 2, 4 ml/min. Calculate the effective permeability of ISOPAR L in residual brine at 150° F.
8. Coreflood with brine (2% KCl) in rates of 0.5, 2, 4 ml/min at 150° F.
9. Inject methanol 3 pore volumes,
10. Inject IPA 3 pore volumes.
11. Dry the core at 250° F. overnight.
12. Fill the core with a zwitterionic-functional polymer and an organometallic compound in trifluoroethanol solvent (available from Aculon, Inc., as ACULON ON 442) and vacuum pump it for 1 hours
13. Coreflood with ISOPAR L in rates of 0.5, 2, 4 ml/min. Calculate the effective permeability of ISOPAR L at 150° F.
14. Calculate the regain permeability of ISOPAR L.
15. Coreflood with brine (2% KCl) in rates of 0.5, 2, 4 ml/min.
16. Calculate the effective permeability of brine in residual ISOPAR L after treatment ACULON ON 442 at 150° F.

17. Calculate the regain permeability of brine.

TABLE 3

The porosity measurements of Grey Berea sandstone

| Core weight (Dry) | Core weight (saturation with ISOPAR) | Porosity % | Pore volume |
|---|---|---|---|
| 367.8 g | 391 g | 16.66 | 31.19 |

The initial permeability is calculated based on Darcy's law (Table 4).

$\Delta P$ is measured from coreflooding during initial ISOPAR L injection.

Q is the ISOPAR L rates injected in Grey Berea sandstone as reported in step 7.

L is the length of the Grey Berea sandstone measured by caliper.

A is the area of Grey Berea sandstone.

$\mu$ is the viscosity of the ISOPAR in the room temperature (77° F.).

K is the permeability and represents the slope of a plot of $Q*\mu/A$ vs. $\Delta P/L$.

TABLE 4

| Q (cc/s) | P (atm) | A (cm$^2$) | L (cm) | $\mu$ (cp) | Q * $\mu$/A | $\Delta$P/L |
|---|---|---|---|---|---|---|
| 0.083333 | 1.333333 | 12.09481 | 15.4813 | 1.896 | 0.013063 | 0.086125 |
| 0.033333 | 0.517007 | 12.09481 | 15.4813 | 1.896 | 0.005225 | 0.033396 |
| 0.008333 | 0.136054 | 12.09481 | 15.4813 | 1.896 | 0.001306 | 0.008788 |

$K_{init}$ = 152.3

Effective permeability before treatment, using viscosities measured at 150° F.:

Brine Effective Permeability

The pressure values measure from the coreflood are represented in Table 5 and the effective permeability was calculated as 12.7.

TABLE 5

| Q (cc/s) | P (atm) | A (cm$^2$) | L (cm) | $\mu$ (cp) | Q * $\mu$/A | $\Delta$P/L |
|---|---|---|---|---|---|---|
| 0.008333 | 0.462585 | 12.09481 | 15.4813 | 0.54 | 0.000372 | 0.02988 |
| 0.033333 | 1.843537 | 12.09481 | 15.4813 | 0.54 | 0.001488 | 0.119082 |
| 0.066667 | 3.612245 | 12.09481 | 15.4813 | 0.54 | 0.002976 | 0.23333 |

ISOPAR L Effective Permeability

The ISOPAR L effective permeability is calculated in last $\Delta P$ with Darcy's equation (Table 6). K=64.4.

TABLE 6

| Q (cc/s) | P (atm) | A (cm$^2$) | L (cm) | $\mu$ (cp) | Q * $\mu$/A | $\Delta$P/L |
|---|---|---|---|---|---|---|
| 0.066667 | 1.183673 | 12.09481 | 15.4813 | 0.918 | 0.005371 | 0.076421 |

Effective permeability measurements after treatment with ACULON ON 442:

The pressure values measure from the coreflood are represented in Table 7 and the brine effective permeability K is calculated as 6.2. The ISOPAR L effective permeability K is calculated as 110 (Table 8).

Brine Effective Permeability:

TABLE 7

| Q (cc/s) | P (atm) | A (cm$^2$) | L (cm) | $\mu$ (cp) | Q * $\mu$/A | $\Delta$P/L |
|---|---|---|---|---|---|---|
| 0.008333 | 0.986395 | 12.09481 | 15.4813 | 0.54 | 0.000372 | 0.063715 |
| 0.033333 | 3.605442 | 12.09481 | 15.4813 | 0.54 | 0.001488 | 0.23289 |
| 0.066667 | 7.414966 | 12.09481 | 15.4813 | 0.54 | 0.002976 | 0.478963 |

ISOPAR L Effective Permeability:

TABLE 8

| Q (cc/s) | P (atm) | A (cm$^2$) | L (cm) | μ (cp) | Q * μ/A | ΔP/L |
|---|---|---|---|---|---|---|
| 0.008333 | 0.090476 | 12.09481 | 15.4813 | 0.918 | 0.000633 | 0.005844 |
| 0.033333 | 0.351701 | 12.09481 | 15.4813 | 0.918 | 0.00253 | 0.022718 |
| 0.066667 | 0.714286 | 12.09481 | 15.4813 | 0.918 | 0.00506 | 0.046139 |

Regained Permeability:

TABLE 9

| Brine Regained permeability | ISOPAR L Regained permeability |
|---|---|
| 48.81 | 155.27 |

Note that after treatment with a film-forming composition of the present invention, the brine effective permeability through the sandstone decreased while the oil (ISOPAR L) permeability increased, which may allow for an enhanced oil recovery in a subterranean formation.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A film-forming composition comprising:
(a) a zwitterionic-functional polymer; and
(b) an organometallic compound comprising tantalum, titanium, zirconium, lanthanum, hafnium, and/or tungsten, wherein the organometallic compound (b) is present in the film-forming composition in an amount of 0.005 to 2.5 percent by weight, based on the total weight of the film-forming composition; and
wherein by applying the film forming composition to a substrate, the film forming composition reduces adhesion of an organic substance to the substrate.

2. The composition of claim 1, wherein the zwitterionic-functional polymer contains silane groups.

3. The composition of claim 2, wherein the zwitterionic-functional polymer (a) comprises a reaction product of a reaction mixture comprising:
(i) an ethylenically unsaturated zwitterionic monomer; and
(ii) an organosilicon compound comprising functional groups that are reactive with the zwitterionic monomer (i).

4. The composition of claim 3, wherein the functional groups on the organosilicon compound comprise alkoxy, hydroxyl, amino, amide, and/or halide groups.

5. A method of treating a siliceous or metal (M) oxide-containing subterranean formation penetrated by a well comprising: (a) pumping into the well the film-forming composition of claim 1; and (b) chemically bonding one or more components of the film-forming composition to a surface of the subterranean formation.

6. A method of increasing oil production from a siliceous or metal (M) oxide-containing subterranean formation penetrated by a well comprising: (a) pumping into the well the film-forming composition of claim 1; and (b) chemically bonding one or more components of the film-forming composition to a surface of the subterranean formation.

7. A method of reducing adhesion of an organic substance to a substrate, comprising applying a film-forming composition to the substrate by dipping, spraying, wiping, rolling, or brushing, wherein the film-forming composition comprises:
(a) a zwitterionic-functional polymer; and
(b) an organometallic compound comprising tantalum, titanium, zirconium, lanthanum, hafnium, and/or tungsten, wherein the organometallic compound (b) is present in the film-forming composition in an amount of 0.005 to 2.5 percent by weight, based on the total weight of the film-forming composition.

8. The method of claim 7, wherein the substrate comprises metal, metal oxide, silicon, fused quartz glass, soda lime silica glass, sodium borosilicate glass, lead oxide glass, aluminosilicate glass and/or a polymer.

9. The method of claim 7, wherein the zwitterionic-functional polymer contains silane groups.

10. The method of claim 7, wherein the zwitterionic-functional polymer (a) comprises a reaction product of a reaction mixture comprising:
(i) an ethylenically unsaturated zwitterionic monomer; and
(ii) an organosilicon compound comprising functional groups that are reactive with the zwitterionic monomer (i).

11. The method of claim 10, wherein the monomer (i) comprises [2-(methacryloyloxy)ethyl]dimethyl-(3-sulfopropyl)ammonium hydroxide.

12. The method of claim 10, wherein the functional groups on the organosilicon compound comprise alkoxy, hydroxyl, amino, amide, and/or halide groups.

13. The method of claim 10, wherein the reaction mixture further comprises a different ethylenically unsaturated monomer (iii) comprising ethylene, propylene, styrene, vinyl toluene, (meth)acrylic acid, a (meth)acrylamide, and/or an ester of (meth)acrylic acid.

14. The method of claim 10, wherein the organosilicon compound (ii) comprises (3-trimethoxysilyl)propyl (meth)acrylamide, (3-trimethoxysilyl)propyl (meth)acrylate, and/or (3-trimethoxysilyl)propyl-2-bromo-2-methylpropionate.

15. The method of claim 7, wherein the film-forming composition further comprises (c) a solvent component.

16. The method of claim 15, wherein the zwitterionic-functional polymer (a) is present in the film-forming composition in an amount of 0.005 to 5 percent by weight, based on the total weight of the film-forming composition.

17. The method of claim 7, wherein the substrate comprises medical diagnostic equipment, a breathing apparatus, an electronic device, an implantable device, an electronic fluidic device, a sensor, a mold, a biological/DNA assay surface, filter media, a microfluidic channel, a heat exchanger, oil spill remediation equipment or oil processing equipment.

18. The method of claim 17, wherein the substrate comprises an electronic fluidic device.

* * * * *